United States Patent [19]

Beaudreault et al.

[11] Patent Number: 5,111,565
[45] Date of Patent: May 12, 1992

[54] COMPENSATING ROLL ASSEMBLY FOR FLEXIBLE WEB MATERIAL

[75] Inventors: James J. Beaudreault, North Providence, R.I.; James O. Gallant, Dighton, Mass.

[73] Assignee: S.W. Industries, Inc., Providence, R.I.

[21] Appl. No.: 628,385

[22] Filed: Dec. 14, 1990

[51] Int. Cl.$^5$ ............................................. B21B 13/02
[52] U.S. Cl. ..................... 29/116.2; 29/116.1; 29/123; 29/124; 29/125; 29/113.2
[58] Field of Search ............... 29/116.1, 116.2, 113.1, 29/113.2, 123, 124, 125

[56] References Cited

U.S. PATENT DOCUMENTS

| | | | |
|---|---|---|---|
| 3,854,646 | 12/1974 | Dorfel et al. | 226/191 |
| 4,581,797 | 4/1986 | Lehmann | 29/116.2 |
| 4,692,971 | 9/1987 | Ginter | 26/103 |
| 4,747,195 | 5/1988 | Snellman | 29/116.2 |
| 4,856,157 | 8/1989 | Küsters | 29/113.2 |
| 5,033,317 | 7/1991 | Van Haag | 29/116.2 |

FOREIGN PATENT DOCUMENTS

814172  6/1969  Canada ..................................... 92/15

*Primary Examiner*—P. W. Echols
*Assistant Examiner*—David P. Bryant
*Attorney, Agent, or Firm*—Lorusso & Loud

[57] ABSTRACT

A compensating roll assembly for flexible web material, the roll assembly comprising a central axle member and two end axle members fixed one to each end of the central axle member, support rings disposed around the end axle members, spools disposed on the support rings and the central axle member, roll surface material disposed upon the spools and adapted to engage the web material, and mechanisms disposed within the end axle members to automatically move the support rings during a rolling operation to cause movement of the surface material to maintain substantially constant pressure on the web material by the roll surface material.

11 Claims, 8 Drawing Sheets

COMPENSATING ROLL ASSEMBLY FOR FLEXIBLE WEB MATERIAL

REFERENCE TO RELATED APPLICATION

This application is closely related in subject matter to U.S. Pat. application Ser. No. 07/628,408, filed in the names of James J. Beaudreault and James O. Gallant concurrently with the present application.

BACKGROUND OF THE INVENTION

1. Field of the Invention

This invention relates to roll assemblies and is directed more particularly to a roll assembly for flexible materials, such as paper materials.

2. Description of the Prior Art

Rolls for expanding and contracting flexible materials, such as paper, are known in the art. Such rolls are used for stretching or contracting webs crosswise of their length and for removing wrinkles from moving webs engaged by the rolls. Rolls of the type to which the invention relates are curved, or bowed, rolls, in some instances having a surface of rubber, or the like, mounted on a surface of steel or aluminum segments, generally referred to as spools, or spool assemblies, which are rotatably mounted on a curved axle. Alternatively, rolls of this type may have a surface comprising metal segments mounted on the curved axle and disposed on sections of rubbery material which are rotatable on the axle. The opposite ends of the curved axle typically are clamped and are adjustable so that the curved axis of the axle may be set in any selected plane. Such rolls, and the manner of adjustably supporting the rolls, such that the curved axis of the axle thereof may be set in any desired plane, generally function satisfactorily in stretching or contracting webs crosswise of their length and in removing wrinkles from the webs.

Figure 1:
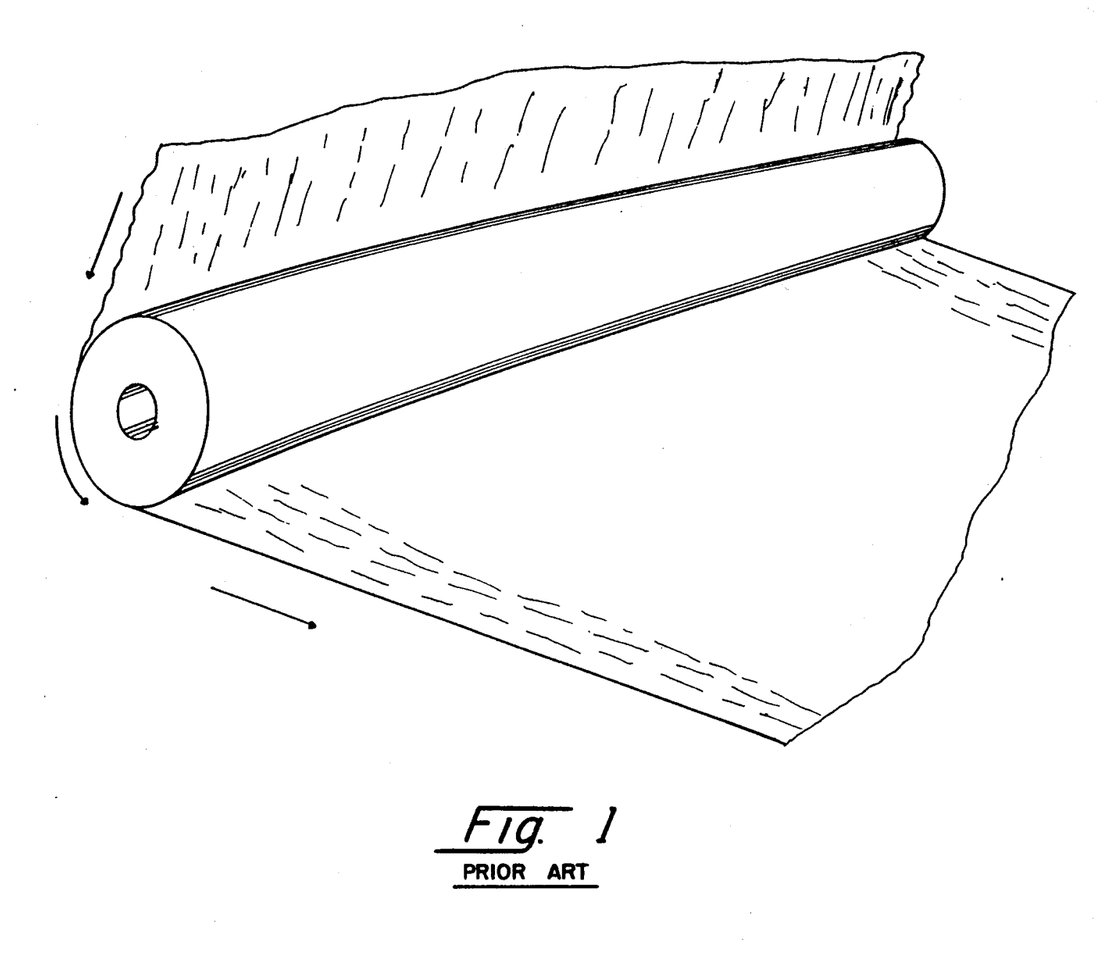
FIG. 1 is a stylized perspective view of a prior art roll assembly in operation with a web of flexible material.

It is found, nevertheless, that in many cases wrinkles in the lengthwise edges of the web are not completely removed because of improper contact with the curved roll. In paper manufacturing, for example, the edges of a web often lengthen more rapidly than the interior body of the web because of differences in temperatures, the physical structure of the paper, and differences in moisture absorption and evaporation. Such often leads to improper edge contact with the curved roll and thus allows wrinkled edges to proceed beyond the curved roll, as illustrated in FIG. 1. In due course, the wrinkled portions of the web must be cut from the web, leading to substantial waste.

Recent advances have resulted in tension compensating rolls having end sections which are adjustable to more precisely modify the expansion or contraction of the web along its opposite edges so as to reduce wrinkling of the edges. U.S. Pat. No. 4,692,971, issued Sept. 15, 1987, in the name of James F. Ginter, describes such a compensating roll. The Ginter compensating roll includes a curved axle having a tubular center section and adjustable solid steel end sections. Each of the end sections comprises a shaft fixed to the center tubular section, a hollow tube disposed about the shaft, means on the shaft for pivotally supporting one end of the tube, and means on the shaft for adjustably supporting the other end of the tube to adjust the other end with respect to the shaft.

While the above improvement provides benefits over the prior art, it is necessary that each of the adjustments discussed in the '971 patent be made manually and through trial-and-error. Further, the adjusted positions of the roll must be changed when the web process conditions change.

It would be beneficial to the industry to have a tension compensating roll with end sections which would automatically maintain a substantially constant pressure on the edge areas of a web.

SUMMARY OF THE INVENTION

It is, therefore, an object of the invention to provide a tension compensating roll assembly with end axle sections having means for automatically maintaining substantially constant pressure between the roll and a web engaged thereby.

With the above and other objects in view, as will hereinafter appear, a feature of the present invention is the provision of a tension compensating roll assembly for flexible web material, the roll assembly comprising a central axle member, a first end axle member fixed to a first end of the central axle member, a second end axle member fixed to a second end of the central axle member, a first support ring means disposed around the first end axle member, a second support ring means disposed around the second end axle member, spool means rotatably disposed on each of the support ring means and the central axle member, roll surface means disposed upon the spool means and adapted to engage the web material, and means disposed within the end axle members to automatically move the supporting ring means relative to the end axle members during a rolling operation, to move the roll surface means to maintain substantially constant pressure on the web by the roll surface means.

The above and other features of the invention, including various novel details of construction and combination of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent. In the drawings.

DESCRIPTION OF THE PREFERRED EMBODIMENT

In FIG. 1, there is illustrated a web of paper with "slack" edges running over a bowed roll. The slack condition of the edges prevents the bowed roll from performing its spreading function and, therefore, edge wrinkles remain in the web, along the edges thereof, after departure of the web from the roll.

Figure 2:
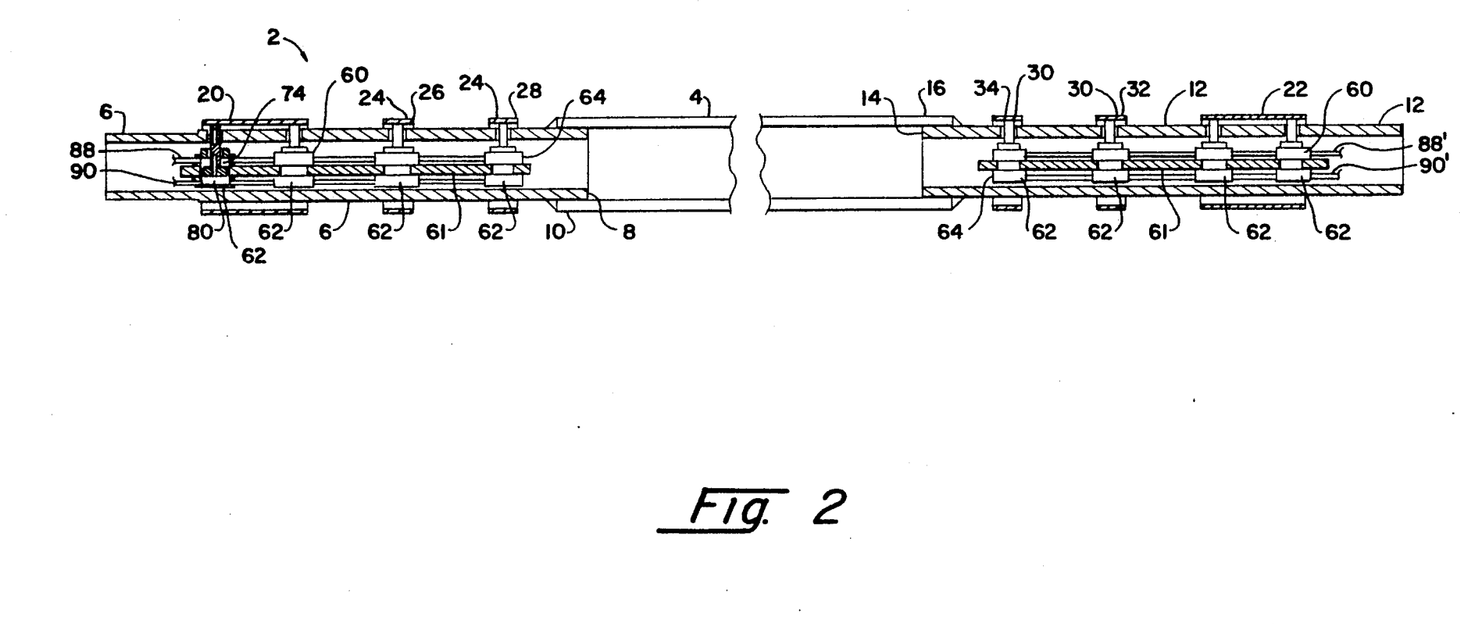
FIG. 2 is a centerline sectional view of a tension compensating roll assembly, less spool assemblies and roll surface means, illustrative of an embodiment of the invention.

Referring to FIG. 2, it will be seen that an illustrative embodiment of a compensating roll assembly in accordance with the invention comprises an axle assembly 2 including a curved rigid tubular central or base axle member 4 and a first curved rigid tubular end axle member 6 having one end 8 fixed to a first end 10 of the central axle member. A second curved rigid tubular end axle member 12 may be fixed at one end 14 to a second end 16 of the central axle member 4. The end 8 of the firs end axle member 6 is disposed within the central axle member 4 and in like manner, the end 14 of the second end axle member 12 is disposed within the central axle member 4. Thus, the outside diameter of the central axle member 4 exceeds the outside diameters of the end axle members 6, 12 by twice the thickness of the central axle member tube wall.

A first end support ring means 20 is disposed around the first end axle member 6, and a second end support ring means 22 is disposed around the second end axle member 12. Similarly, first intermediate support ring mean 24 is disposed around the firs end axle member 6 between the central axle member 4 and the first end support ring means 20. In the embodiment illustrated, the first intermediate support ring means 24 comprises two intermediate support rings 26, 28. Second intermediate support ring means 30 is disposed in similar fashion around the second end axle member 12 between the central axle member 4 and the second end support ring means 22. In the embodiment illustrated, the second intermediate support ring means 30 comprises two intermediate support rings 32, 34.

Figure 3:
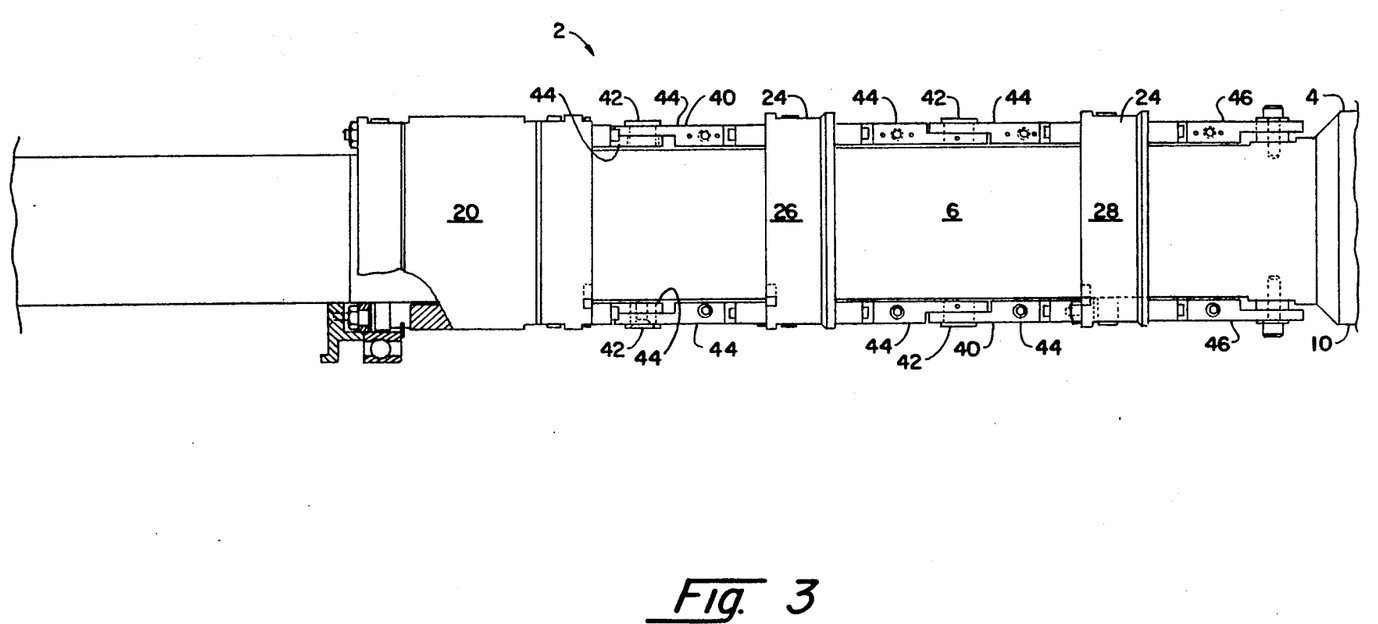
FIG. 3 is a top plan view of a portion of the compensating roll assembly of FIG. 2; though shown straight for ease of depiction, the end axle portion includes a slight curve, barely perceptible to the eye.
Figure 4:
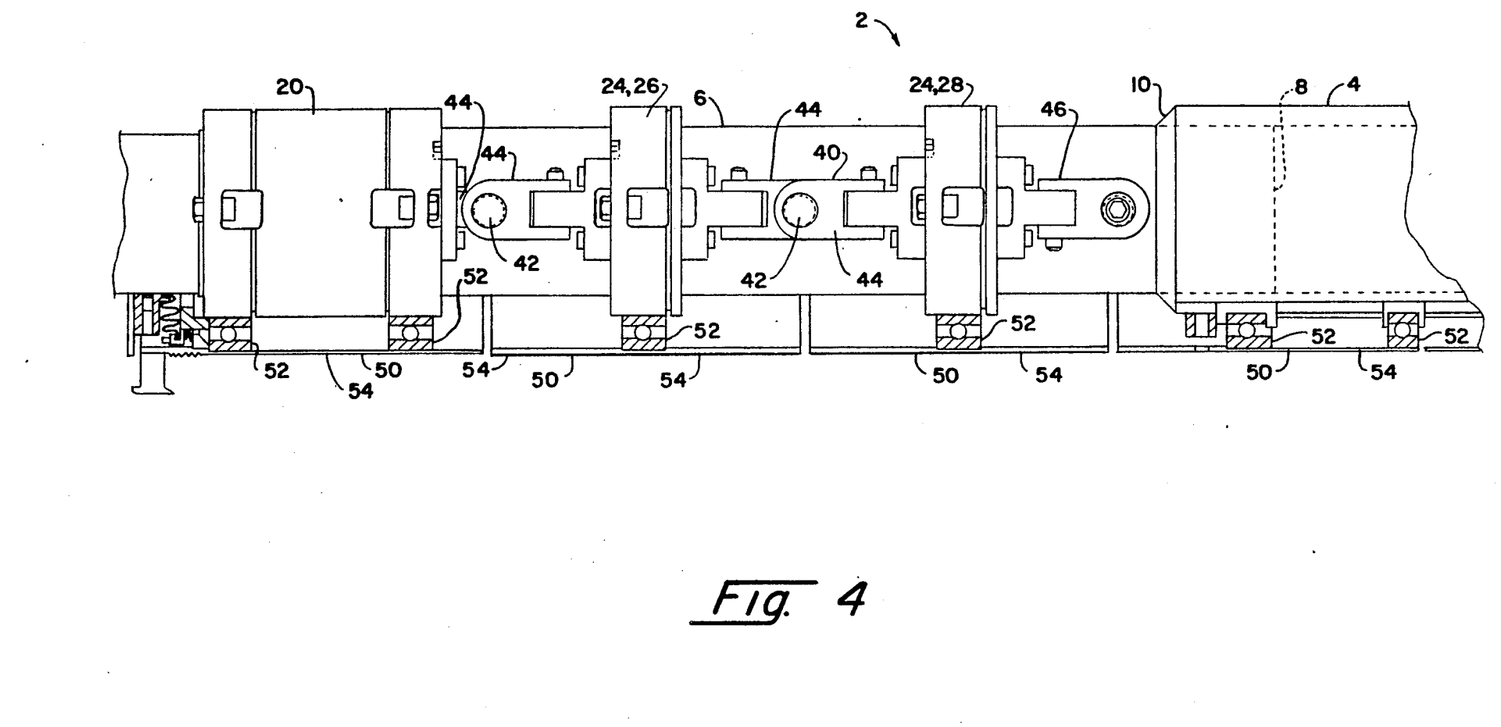
FIG. 4 is a side elevational view of the portion of the compensating roll assembly shown in FIG. 3, but including spool assemblies shown in section on one side of the assembly for illustrative purposes.

On each of the end axle members, one of which 6 is shown in FIGS. 3 and 4, each of the support ring means is interconnected by hinge means 40. The hinge means comprise an arrangement of pins 42 and arms 44 which permit pivotal movement of any given support ring means relative to a next adjoining support ring means. An additional hinge means 46 interconnects the intermediate support rings 28, 34 nearest the central axle member 4, and a portion of the end axle member adjacent the central axle member.

Mounted on each of the support ring means 20, 22, 24, 30 and the central axle member 4 are spool assemblies 50 (FIGS. 4 and 5) comprising bearings 52 and rotatable spool shells 54. The bearings 52 are supported by the support ring means. Roll surface means 58 (FIG. 5), preferably a rubber-like sleeve, is mounted on the spool shells 54 and is rotatable therewith and is adapted to engage a web material.

Figure 5:
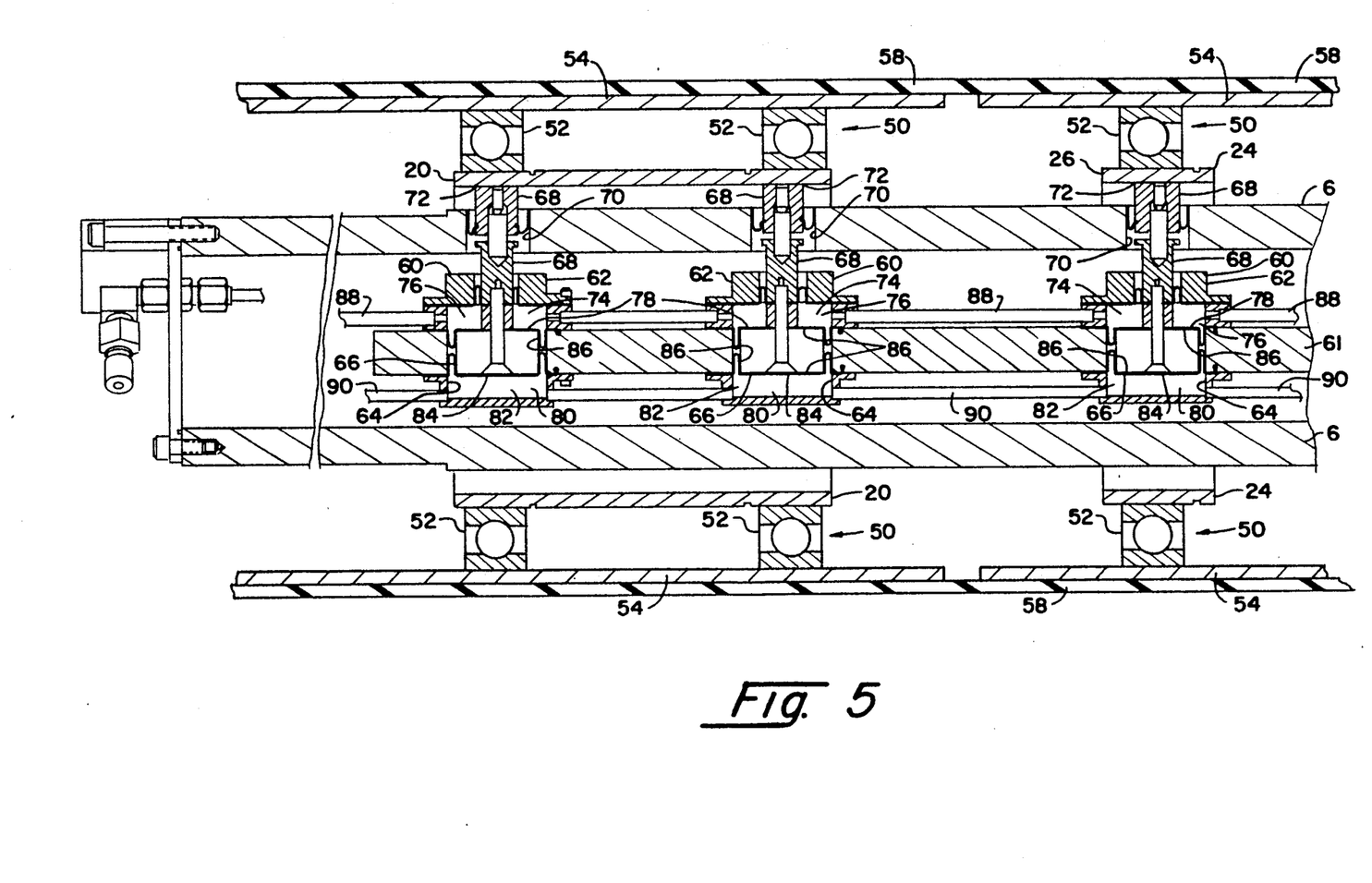
FIG. 5 is a centerline sectional view of the portion of the compensating roll assembly shown in FIG. 4, but including depiction of spool assemblies and roll surface means.

In FIGS. 2 and 5, it will be seen that moving means 60 are disposed within the end axle members 6, 12 and operate to automatically move the support ring means 20, 22, 24, 30 relative to the end axle members to cause movement of the spool shells 54, and thereby the roll surface means 58, to automatically alter the pressure exerted on the web material by the roll surface means 58.

The moving means 60 for each of the support ring means 20, 22, 26, 28, 32, 34 are mounted on rigid bars 61 (FIGS. 2 and 5) disposed in the end axle members and each comprises a piston and cylinder assembly 62, including a cylinder 64, a piston 66 (FIG. 5) disposed in the cylinder 64, and a piston pin means 68 extending from the piston 66 through an opening 70 in the end axle member. A distal end 72 of the piston pin means 68 is connected to the support ring means. In the embodiment illustrated, the end support ring means 20, 22, (ring means 20 illustrated in FIG. 5), which are heavier than the intermediate support rings and which are not as well stabilized by the roll surface means, are each connected to two of the piston and cylinder assemblies 62. The intermediate support rings 26, 28, 32, 34 are each connected to a single piston and cylinder assembly 62.

Figure 6:
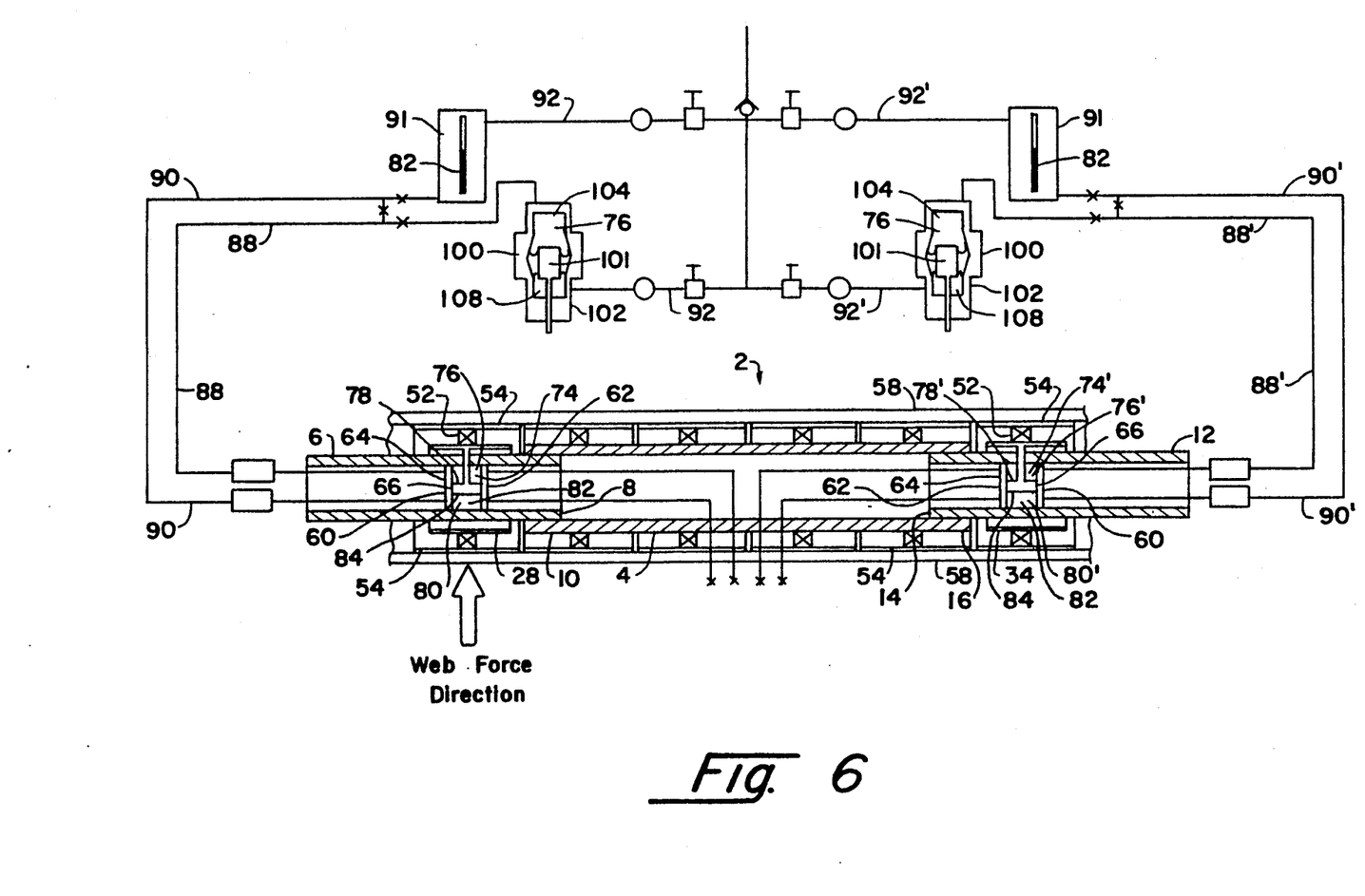
FIG. 6 is a partially diagrammatic view of the compensating roll assembly illustrative of an embodiment of the invention and showing the fluid circuits.

Each cylinder 64 in the end axle member 6 (FIG. 5) is provided with a first chamber 74 for a first fluid 76 acting on a first pressure surface 78 of the piston 66 and a second chamber 80 for a second fluid 82 acting on a second pressure surface 84 of the piston 66. Similarly, each cylinder 64 in the second end axle member 12 is provided with a first chamber 74' for the first fluid 76 acting on a first pressure surface 78' of the piston 66 and a second chamber 80' for the second fluid 82 acting on a second pressure surface 84' of the piston 66, shown diagrammatically in FIG. 6.

As may be seen in FIG. 5, the chambers 74, 80 are provided with diaphragm members 86, such that the chambers are sealed except for fluid inlet and outlet means in each of the chambers. In like manner, diaphragm members are provided in the chambers 74' and 80'. All of the first chambers 74, one being shown in FIG. 6 for illustrative purposes, comprise part of a first circuit 88 containing the first fluid 76, and each of the second chambers 80 comprise part of a second circuit 90 containing the second fluid 82. Similarly, all of the first chambers 74', one being shown in FIG. 6 for illustrative purposes, comprise part of a third circuit 88' containing the first fluid 76, and each of the second chambers 80' comprise part of a fourth circuit 90' containing the second fluid 82. The first fluid 76 and the second fluid 82 preferably are liquids, such as oil. In operation, the second fluid is maintained under constant pressure.

In each of the second and fourth fluid circuits 90, 90', there is disposed a liquid/gas tank 91 (FIG. 6) in which a gas, such as air, from a respective gas circuit 92, 92', is maintained under substantially constant pressure and acting upon a reservoir for the second fluid 82.

In each of the first and third fluid circuits 88, 88', there is disposed a master cylinder assembly 100 (FIGS. 6 and 7) comprising a master piston 101 housed in a master cylinder 102 having a first master chamber 104 in communication with one of the first or third fluid circuits 88, 88', and adapted to contain the first fluid 76 for acting on a first master piston pressure surface 106 (FIG. 7) and a second master chamber 108 in communication with one of the gas circuits 92, 92', and adapted to contain the gas for acting on a second master piston pressure surface 110.

Figure 7:
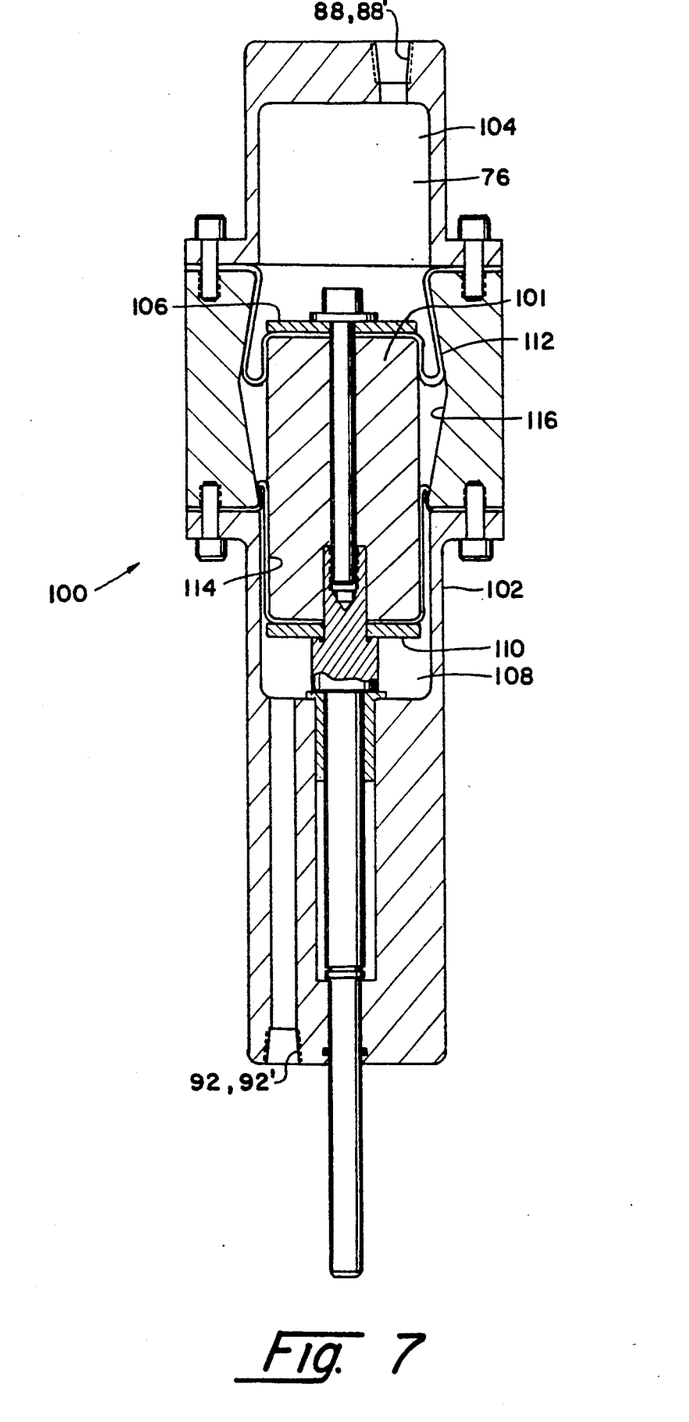
FIG. 7 is a centerline sectional view of a master cylinder assembly portion of the compensating roll assembly of FIG. 6.

Each of the master cylinder assemblies 100 is provided with a rolling diaphragm 112 interconnecting the wall of the first master chamber 104 and the first master piston pressure surface 106, and a rolling diaphragm 114 interconnecting the wall of the second master chamber 108 and the second master piston pressure surface 110. The master cylinder 102 is provided with a double tapered side wall 116 (FIG. 7). The tapers are structured such that as the master piston 101 moves, the effective area of one diaphragm is increased while the effective area of the other diaphragm is decreased. As the diaphragms move toward the center of the cylinder, more of the diaphragms is exposed to pressure and the diaphragms become pressure surface extensions of the pressure surfaces 106, 110. A substantially constant pressure exists in the second master chambers 108 and the second and fourth fluid circuits 90, 90'. The pressure in the first master chambers 104 and the first and third fluid circuits 88, 88' vary in response to a change in pressure between the roll and the web which causes movement of the pistons 66, which in turn, causes movement of the master piston 101. The changing first and third fluid circuit pressures create changing forces in the first and third fluid circuits 88, 88' and the piston and cylinder assemblies' first chambers 74, 74' in the opposite direction of a changing force on the support ring means 20, 22, 24, 30.

Figure 8:
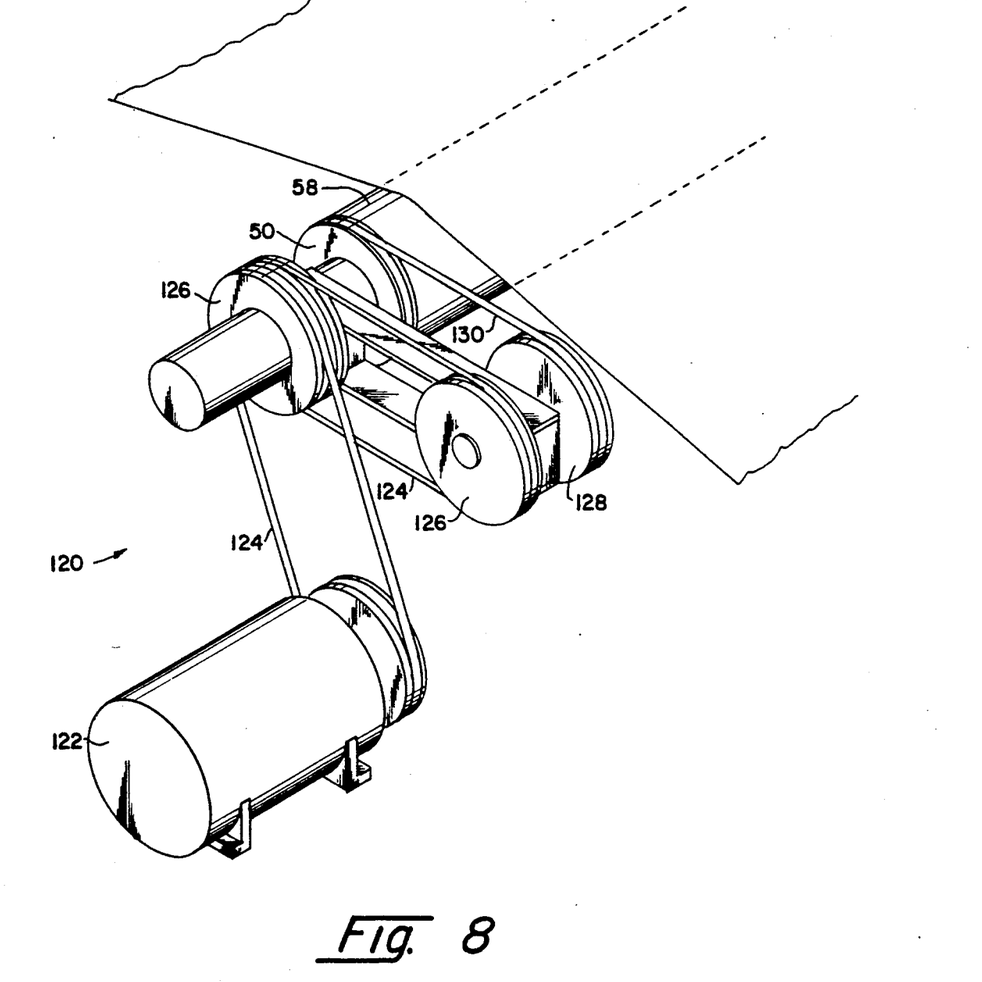
FIG. 8 is a perspective view of a drive means for the compensating roll assembly.

Referring to FIG. 8, it will be seen that an illustrative drive means 120 comprises a motor 122 connected by belts 124 and spindles 126 to a drive wheel 128 which, in turn, is connected by a drive belt 130 to an end spool assembly 50. As the end spool assembly 50 is rotated on its support ring, it carries with it the roll surface means 58 which, in turn, carries with it the remaining spool assemblies, such that the drive means 120 causes the spool and roll surface means to rotate about the stationary axle assembly. The area of contact between the drive belt 130 and the spool 50 is centered at a point normal to the direction of travel of the pistons 66. Thus, the force exerted by the drive belt 130 on the spool 50 is centered at a point generally normal to the direction of travel of the pistons 66. Accordingly, the force exerted by the drive belt 130 does not substantially impinge upon the support rings so as to activate a response by the piston and cylinder assemblies 62.

The piston and cylinder assemblies 62 are set by selection of air pressure in the gas/liquid tanks 91, and thereby the pressure in the second and fourth circuits 90, 90' such that the various forces acting upon the support rings are balanced; that is, the weight of the roll, the tension on the web, and the like, are in equilibrium. As a rolling operation progresses, the above-described roll assembly operates to correct the problem of slack or overly-tensioned edges in a web of material by automatically adjusting its end profile to maintain a selected web tension. For example, the web running over the ends of the roll may be slack, because of lack of proper contact with the roll's ends. If web tension at an end of the roll is less than that for which the system is set, first fluid 76 pressure urges a spool 54 (FIG. 6), and thereby the roll surface means 58, downwardly into the web. As first fluid 76 leaves the master cylinder chamber 104, through the circuit 88, to enter the first chambers 74 of the piston and cylinder assemblies 62, the master cylinder tapered walls 116 causes the first fluid pressure to increase in the circuit 88 to create greater force in the chambers 74, to maintain the spool 54 in its adjusted position until there is a change in rolling conditions. As the spool 54 moves downwardly to urge the roll surface means 58 into more forceful contact with the web, pressure in the chambers 74 is required to overcome the tendency of the roll surface means 58 to return to its original position. The master cylinder operates, through the fluid circuits 88, 88', to maintain pressure in the chambers 74, 74' sufficient to overcome slack conditions as they occur, and also to balance the spring bias of the surface means 58 toward its "neutral" position.

It is to be understood that the present invention is by no means limited to the particular construction herein disclosed and/or shown in the drawings, but also comprises any modifications of equivalents within the scope of the disclosure. For example, rather than having a rubber-like roll surface means 58, as described in the above illustrative embodiment, the compensating roll assembly may be provided with a series of interconnected metal segments constituting the roll surface means.

Having thus described our invention what we claim as new and desire to secure by Letters Patent of the U.S. is:

1. A compensating roll assembly for flexible web material, said roll assembly comprising a central axle member, a first end axle member fixed to a first end of said central axle member, a second end axle member fixed to a second end of said central axle member, a first support ring means disposed around said first end axle member, a second support ring means disposed around said second end axle member, spool means rotatably disposed on each of said support ring means and said central axle member, roll surface means disposed on said spool means and adapted to engage said web material, and first and second moving means disposed, respectively, within said first and second end axle members to automatically move said first and second support ring means, respectively, relative to said respective first and second end axle members, during a rolling operation, to move said roll surface means to maintain substantially constant pressure on said web by said roll surface means, said first and second moving means being independent of each other.

2. The roll assembly in accordance with claim 1 in which on each of said end axle members said support ring means comprises end support ring means and intermediate support ring means, said intermediate support ring means being disposed between said end support ring means and said central axle member.

3. The roll assembly in accordance with claim 2 in which on each of said end axle members said support ring means are interconnected by hinge means.

4. The roll assembly in accordance with claim 3 in which said hinge means permit movement of one support ring means relative to a nest adjoining support ring means.

5. The roll assembly in accordance with claim 2 in which said moving means disposed within said end axle members to automatically move said support ring means comprises for each support ring means at least one cylinder and piston assembly, and a piston pin means extending through openings in said end axle member, a distal end of said piston pin means being connected to said support ring means.

6. The roll assembly in accordance with claim 5 in which each of said end support ring means is connected to two cylinder and piston assemblies.

7. The roll assembly according to claim 5 including drive means, said drive means comprising motive means and drive belt means, said drive belt means being engaged with one of said spool assemblies to rotate said spool assembly, said surface means, and remaining spool assemblies, said drive belt engaging said one spool assembly in an area having a center substantially normal to the axes of pistons of said cylinder and piston assemblies.

8. A compensating roll assembly for flexible web material, said roll assembly comprising a tubular central axle member, a first tubular end axle member having one end fixed to a first end of said central axle member, a second tubular end axle member having one end fixed to a second end of said central axle member, a first end support ring means disposed around said first end axle member, a second end support ring means disposed around said second end axle member, first intermediate support ring means disposed around said first end axle member between said central axle member and said first end support ring means, second intermediate support ring means disposed around said second end axle member between said central axle member and said second end support ring means, spool means rotatably disposed on each of said support ring means and said central axle member, roll surface means disposed upon said spool means and adapted to engage said web material, and means disposed within said tubular end axle members to automatically move said support ring means relative to said tubular end axle members to move said roll surface means to automatically alter pressure exerted on said web material by said roll surface means, said moving means for each of said support ring means comprising at least one cylinder, a piston disposed in said cylinder, piston pin means extending from said piston through openings in said end axle member, a distal end of said piston pin means being connected to said support ring means, said cylinder having a first chamber for a first fluid acting on a first pressure surface of said piston and a second chamber for a second fluid acting on a second pressure surface of said piston. piston.

9. The roll assembly in accordance with claim 8 in which each of said first chambers comprise part of a first circuit containing said first fluid and each of said second chambers comprising part of a second circuit containing said second fluid.

10. The roll assembly in accordance with claim 9 in which said first and second fluids are liquids.

11. The roll assembly in accordance with claim 9 and further including a master cylinder, said master cylinder being adapted to respond to force changes between said roll surface means and said web to provide for modified fluid pressure in said first circuit and said first chambers to counter said force changes and to counter a force developed by movement of said roll surface means away from a neutral position.

* * * * *